(12) United States Patent
Wang et al.

(10) Patent No.: US 10,503,058 B2
(45) Date of Patent: Dec. 10, 2019

(54) PROJECTION DEVICE

(71) Applicant: BOE TECHNOLOGY GROUP CO., LTD., Beijing (CN)

(72) Inventors: Xin Wang, Beijing (CN); Jianhua Du, Beijing (CN); Fan Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 156 days.

(21) Appl. No.: 15/565,793

(22) PCT Filed: Jun. 30, 2017

(86) PCT No.: PCT/CN2017/091078
§ 371 (c)(1),
(2) Date: Oct. 11, 2017

(87) PCT Pub. No.: WO2018/099065
PCT Pub. Date: Jun. 7, 2018

(65) Prior Publication Data
US 2019/0049827 A1 Feb. 14, 2019

(30) Foreign Application Priority Data
Dec. 2, 2016 (CN) .................... 2016 2 1316323 U

(51) Int. Cl.
*G03B 21/14* (2006.01)
*H04N 9/31* (2006.01)
*H04M 1/02* (2006.01)
*H04M 1/04* (2006.01)

(52) U.S. Cl.
CPC ............ *G03B 21/145* (2013.01); *H04M 1/04* (2013.01); *H04N 9/31* (2013.01); *H04M 1/0272* (2013.01)

(58) Field of Classification Search
CPC .... G03B 21/14; G03B 21/145; G03B 21/005; H04N 9/31; H04N 9/3173; H04M 1/04; H04M 1/0272
USPC ........................................................ 353/122
See application file for complete search history.

(56) References Cited

U.S. PATENT DOCUMENTS

| 8,323,041 B2 * | 12/2012 | Gore ................... H04N 9/3173 439/133 |
| 2002/0063855 A1 * | 5/2002 | Williams ............... G03B 29/00 353/122 |
| 2010/0002151 A1 * | 1/2010 | Pan ....................... G06F 3/1454 348/744 |
| 2011/0128511 A1 * | 6/2011 | Ko .......................... G03B 21/30 353/119 |

(Continued)

FOREIGN PATENT DOCUMENTS

CN 1356841 A 7/2002
CN 205067959 U 3/2016
(Continued)

OTHER PUBLICATIONS

International Search Report and Written Opinion for Application No. PCT/CN2017/091078, dated Jul. 27, 2017, 9 Pages.

*Primary Examiner* — William C. Dowling
(74) *Attorney, Agent, or Firm* — Brooks Kushman P.C.

(57) ABSTRACT

A projection device includes a snap-in structure for securing a mobile terminal; a first data interface arranged on the device body and connected to a second data interface of the mobile terminal; and a projection unit secured on the device body and connected to the first data interface.

18 Claims, 10 Drawing Sheets

(56) References Cited

U.S. PATENT DOCUMENTS

2013/0314677 A1* 11/2013 Rodriguez, Jr. ....... G03B 17/54
                                                            353/119
2014/0016295 A1    1/2014  Huang et al.

FOREIGN PATENT DOCUMENTS

| CN | 205594909 U | 9/2016 |
| CN | 206181269 U | 5/2017 |
| KR | 100514074 B1 | 9/2005 |

\* cited by examiner

PROJECTION DEVICE

CROSS-REFERENCE TO RELATED APPLICATIONS

This application is the U.S. national phase of PCT Application No. PCT/CN2017/091078 filed on Jun. 30, 2017, which claims priority to Chinese Patent Application No. 201621316323.2 filed on Dec. 2, 2016, which are incorporated herein by reference in their entireties.

TECHNICAL FIELD

The present disclosure relates to the field of electronic device, in particular to a projection device.

BACKGROUND

Along with the rapid development of science and technology, mobile terminals have become indispensable in our lives due to such advantages as entertainment diversity and being portable. In use, usually it is necessary to project an image display by the mobile terminal.

Currently, as a feasible way in the related art, the mobile terminal is connected to a projection device via a data line, or a projection unit is directly integrated into the mobile terminal, so as to project the image displayed by the mobile terminal. However, in the case that the mobile terminal is connected to the projection device via the data line, it is still impossible to meet the requirement of some users who want to use a projection function, which is provided by the mobile terminal, at any time and at any place. In the case that the projection device is directly integrated into the mobile terminal, although the mobile terminal is provided with the projection function, for some other users who use the projection function at a low frequency, the mobile terminal is too expensive due to the projection unit, so they will not select this kind of mobile terminal.

Hence, due to a projection structure and a projection mode, it is impossible for the conventional mobile terminal to meet the various requirements of the users.

SUMMARY

An object of the present disclosure is to provide a projection device capable of being assembled with, and separated from, the mobile terminal, so as to meet the various requirements of the users.

The present disclosure provides in some embodiments a projection device, including: a device body including a snap-in structure for securing a mobile terminal; a first data interface arranged on the device body and connected to a second data interface of the mobile terminal; and a projection unit secured on the device body and connected to the first data interface.

In a possible embodiment of the present disclosure, the device body includes a support portion and a projection portion connected to the support portion through a rotation mechanism, and an inclination angle of the projection portion relative to the support portion is capable of being changed through the rotation mechanism. The projection unit includes a projected image generation element secured onto the support portion and a projected image output element secured onto the projection portion.

In a possible embodiment of the present disclosure, the snap-in structure includes a first slot into which a portion of a first end surface of the mobile terminal is capable of being snapped.

In a possible embodiment of the present disclosure, the snap-in structure further includes a second slot into which a portion of a second end surface of the mobile terminal opposite to the first end surface is capable of being snapped, and the second slot is arranged opposite to and parallel to the first slot.

In a possible embodiment of the present disclosure, the first slot is provided with an opening at an end surface of the device body, the end surface with the opening is connected to an end surface with the first slot, and the mobile terminal is capable of being moved through the opening and along the first slot toward an end surface opposite to the end surface with the opening so that the portion of the first end surface of the mobile terminal is inserted into the first slot.

In a possible embodiment of the present disclosure, the first data interface is movably arranged on the device body. When the mobile terminal is separated from the device body, the first data interface is located at a first position away from a position of the second data interface of the mobile terminal secured onto the device body. When the mobile terminal is secured onto the device body, the first data interface is located at a second position and connected to the second data interface.

In a possible embodiment of the present disclosure, the device body is further provided with a touch button connected to the first data interface through a driving mechanism. When the mobile terminal is secured onto the device body, the mobile terminal is pressed against the touch button, to trigger the driving mechanism, thereby to move the first data interface from the first position to the second position.

In a possible embodiment of the present disclosure, the driving mechanism includes a first elastic support structure connected to the touch button, a second elastic support structure connected to the first data interface, and a rod-like structure connected between the first elastic support structure and the second elastic support structure.

In a possible embodiment of the present disclosure, the driving mechanism includes a first airbag connected to the touch button, a second airbag connected to the first data interface, and a pipeline in communication with the first airbag and the second airbag.

In a possible embodiment of the present disclosure, the driving mechanism includes a pressure sensor connected to the touch button, a time-delay circuit electrically connected to the pressure sensor, and an actuator connected to the time-delay circuit and the first data interface. The time-delay circuit is configured to receive a predetermined signal from the pressure sensor and transmit a control signal to the actuator after a predetermined time period, and the actuator is configured to drive the first data interface to move.

In a possible embodiment of the present disclosure, the projection device further includes a first projection structure for projecting an image displayed on a screen of the mobile terminal and a second projection structure for projecting an image of a keyboard.

In a possible embodiment of the present disclosure, the device body is further provided with a power supply unit, an audio player and a voice receiver which are connected to the first data interface.

In a possible embodiment of the present disclosure, the support portion includes a base and a connector configured to connect the base to the projection portion.

In a possible embodiment of the present disclosure, the snap-in structure includes a first slot formed in the base, and a portion of a first end surface of the mobile terminal is snapped into the first slot.

In a possible embodiment of the present disclosure, the first slot is provided with an opening at an end surface of the base, the end surface with the opening is connected to an end surface with the first slot, and the mobile terminal is moved through the opening and along the first slot toward an end surface opposite to the end surface with the opening so that the portion of the first end surface of the mobile terminal is inserted into the first slot.

In a possible embodiment of the present disclosure, the second slot is formed in the connector.

In a possible embodiment of the present disclosure, the first data interface is movably arranged on the device body between a first position and a second position. The first data interface is connected to the second data interface at the second position, and separated from the second data interface at the first position.

According to the projection device in the embodiments of the present disclosure, the snap-in structure is arranged on the device body with the projection unit, and the mobile terminal is capable of being connected to or separated from the projection device through the snap-in structure. In this way, it is unnecessary to provide the mobile terminal with a projection function. When it is necessary to meet the requirement on the projection function of the mobile terminal, it is merely necessary to secure the mobile terminal onto the device body. As a result, it is able for the projection device to meet various requirements on the mobile terminal.

BRIEF DESCRIPTION OF THE DRAWINGS

FIG. 2b is a schematic view showing the mobile terminal secured onto the projection device in FIG. 1a;

DETAILED DESCRIPTION OF THE EMBODIMENTS

Figure 1A:
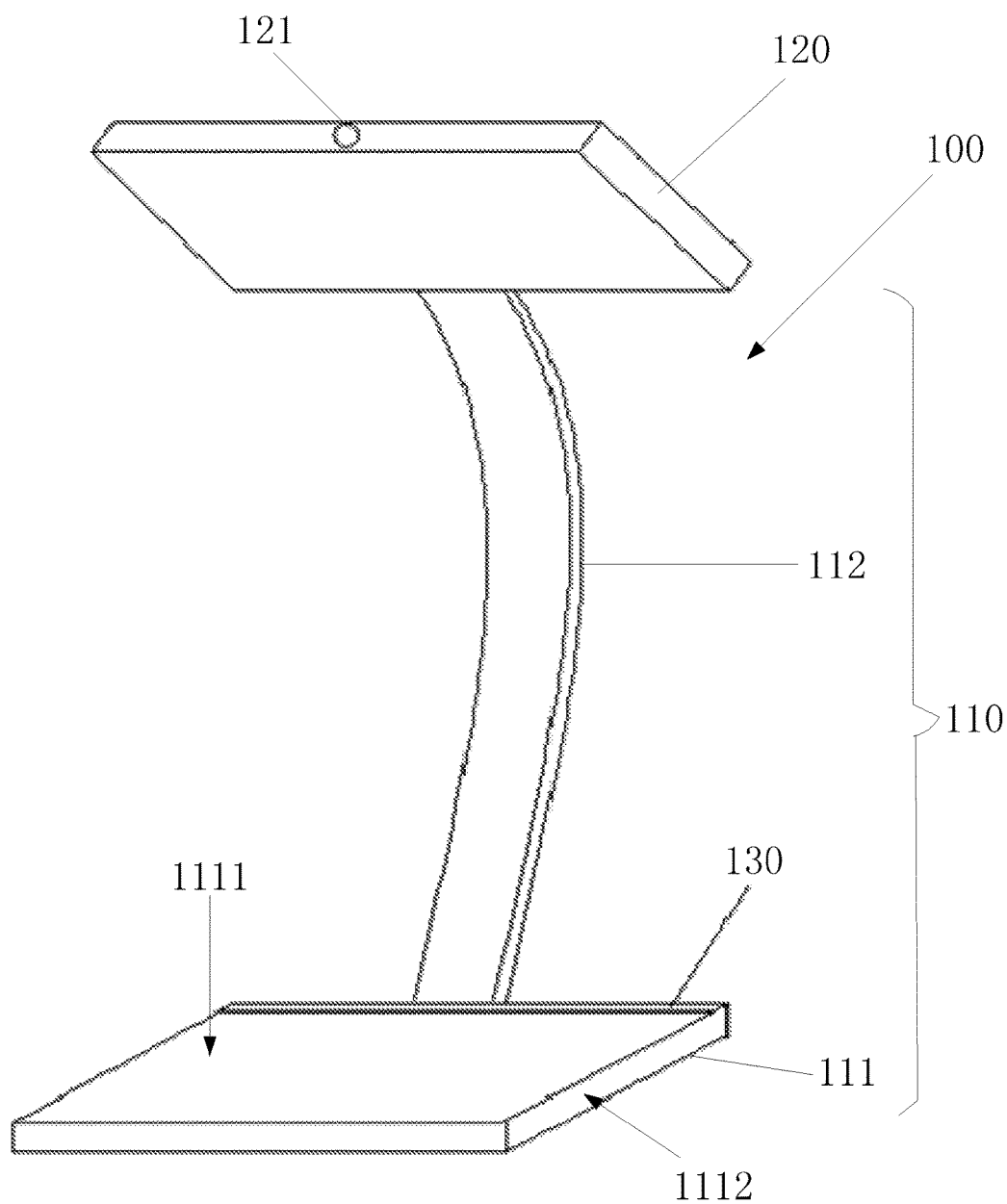
FIG. 1a is a schematic view showing a projection device according to one embodiment of the present disclosure.

The present disclosure will be described hereinafter in conjunction with the drawings and embodiments. The following embodiments are for illustrative purposes only, but shall not be used to limit the scope of the present disclosure.

The present disclosure provides in some embodiments a projection device, which includes: a device body including a snap-in structure for securing a mobile terminal; a first data interface arranged on the device body and connected to a second data interface of the mobile terminal in the case that the mobile terminal is secured onto the device body; and a projection unit secured on the device body and connected to the first data interface. Through the snap-in structure, the mobile terminal is capable of being switched between a state in which the mobile terminal is secured onto the device body and a state in which the mobile terminal is separated from the device body.

According to the projection device in the embodiments of the present disclosure, the snap-in structure is arranged on the device body with the projection unit, and the mobile terminal is capable of being connected to or separated from the projection device through the snap-in structure. In this way, it is unnecessary to provide the mobile terminal with a projection function. In the case that it is necessary to meet the requirement on the projection function of the mobile terminal, it is merely necessary to secure the mobile terminal onto the device body. As a result, it is able for the projection device to meet various requirements on the mobile terminal.

In the projection device, through the data transmission between the first data interface and the second data interface of the mobile terminal, it is able for the projection unit to project an image displayed by the mobile terminal and/or an image for inputting data into the mobile terminal (e.g., an image of a keyboard). In the case of projecting the image displayed by the mobile terminal, a user may view contents displayed by the mobile terminal through a projected image, and in the case of projecting the image for inputting the data into the mobile terminal, e.g., projecting a keyboard, the user may input the data into the mobile terminal using the keyboard as an input interface.

Hence, according to the embodiments of the present disclosure, the projection device may provide various projection modes for the mobile terminal, and it may be operated conveniently, so as to meet various projection requirements of the user.

In a possible embodiment of the present disclosure, the device body includes a support portion and a projection portion connected to the support portion through a rotation mechanism, and an inclination angle of the projection portion relative to the support portion is capable of being changed through the rotation mechanism. The projection unit includes a projected image generation element secured onto the support member and a projected image output element secured onto the projection portion.

In the embodiments of the present disclosure, the projected image output element may be arranged on the projection portion, and the inclination angle of the projection portion relative to the support portion may be changed. As a result, it is able to adjust a projection angle of the projection unit, thereby to meet the requirements on the projection angle.

Figure 1B:
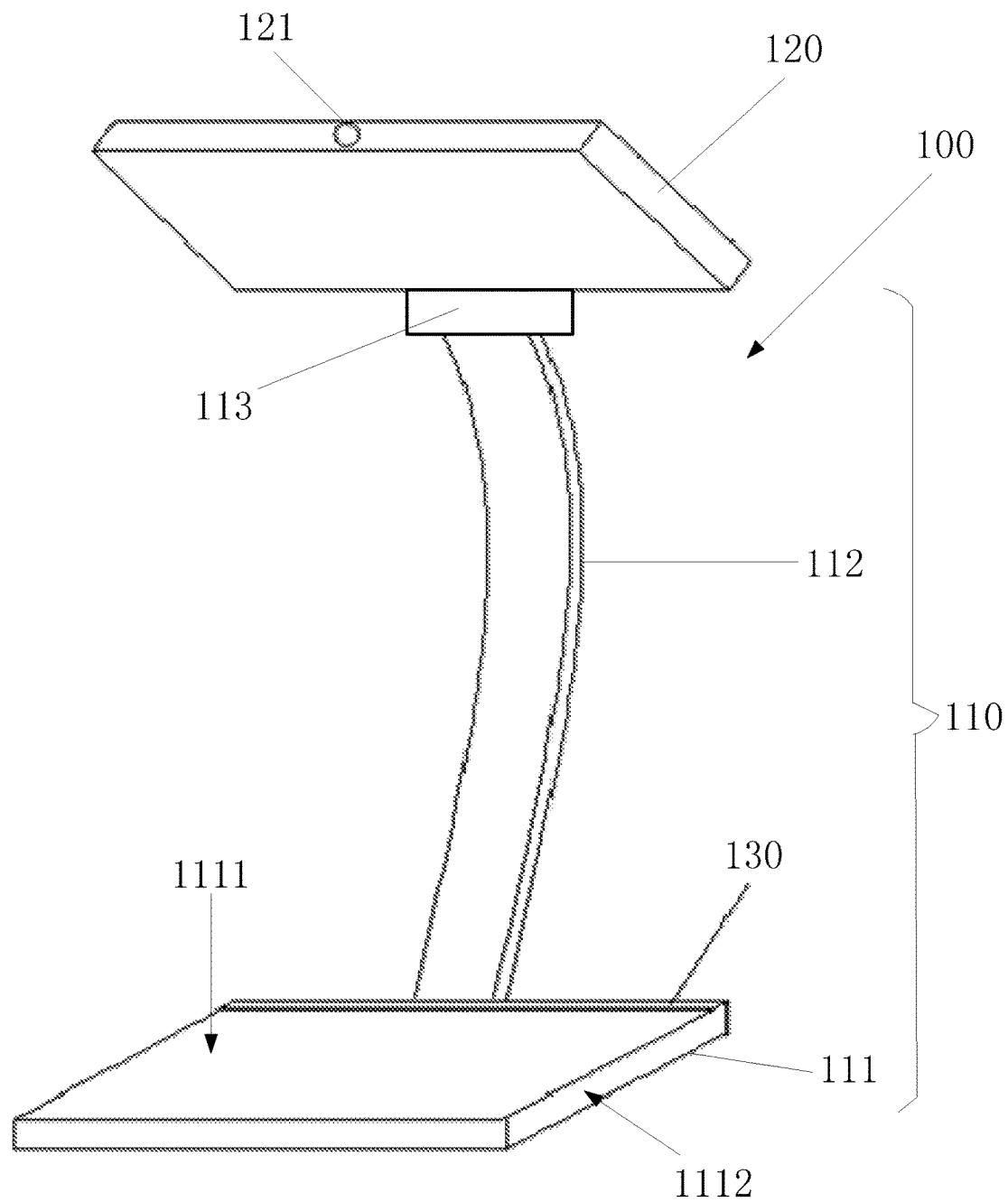
FIG. 1b is another schematic view showing the projection device according to one embodiment of the present disclosure.

As shown in FIG. 1a which is a schematic view showing the projection device according to one embodiment of the present disclosure, the projection device includes a device body 100 which includes a support portion 110 and a projection portion 120 connected to the support portion 110 through a rotation mechanism 113. In some embodiments of the present disclosure, the rotation mechanism 113 may be arranged as shown in FIG. 1b. Through the rotation mechanism between the support portion 110 and the projection portion 120, it is able for the projection portion 120 to rotate relative to the support portion 110 within a predetermined angle range, thereby to change the inclination angle of the projection portion 120 relative to the support portion 110.

A structure of the rotation mechanism for rotating the projection portion 120 relative to the support portion 110 is known in the art and it is not a research focus, and thus will not be particularly defined herein.

As shown in FIG. 1a, in some embodiments of the present disclosure, the support portion 110 includes a base 111 and a connector 112. The base 111 includes a flat support bottom surface, so as to place the entire projection device onto a horizontal plane. The connector 112 is connected between the base 111 and the projection portion 120. In FIG. 1a, the base 111 is of a flat-plate structure, and the connector 112 is of a curved rod structure. The shapes of the base 111 and the connector 112 are merely for illustrative purposes, but shall not be used to limit the structure of the device body 100.

In a possible embodiment of the present disclosure, in the case that the projection device is placed onto a plane through the support bottom surface of the base 111 and the mobile terminal is secured onto the projection device through the snap-in structure on the device body 100, a screen of the mobile terminal is angled relative to the support bottom surface at a predetermined inclination angle, e.g., 90°, i.e., the screen of the mobile terminal is perpendicular to the plane onto which the support bottom surface is secured. Of course, the predetermined inclination angle is not limited to 90°, it may also be greater than 90°. In this way, in the case that the mobile terminal is secured onto the projection device for displaying an image, it is able for a viewer to view the contents displayed on the screen of the mobile terminal simultaneously.

Figure 2A:
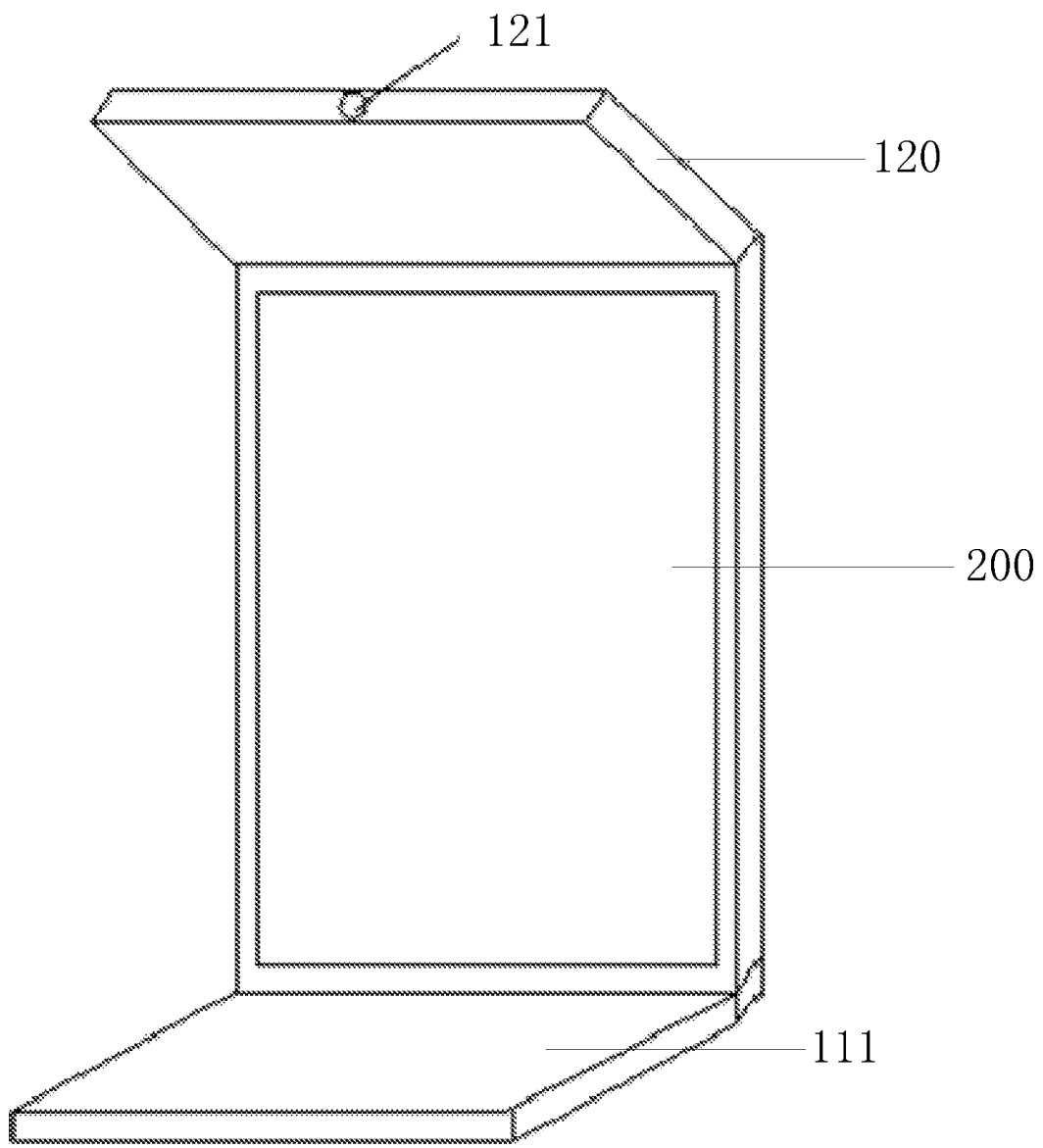
FIG. 2a is a schematic view showing the projection device in FIG. 1a onto which a mobile terminal is secured.

FIG. 2a is a schematic view showing the mobile terminal 200 arranged on the projection device in FIG. 1a. In the case that the mobile terminal 200 is secured onto the projection device, the screen is in an upright state, so it is able for the viewer to view the contents displayed on the screen conveniently.

In some embodiments of the present disclosure, the base 111 and the connector 112 may each be provided with a relatively large accommodation space for accommodating therein members of the projection unit.

Figure 8:
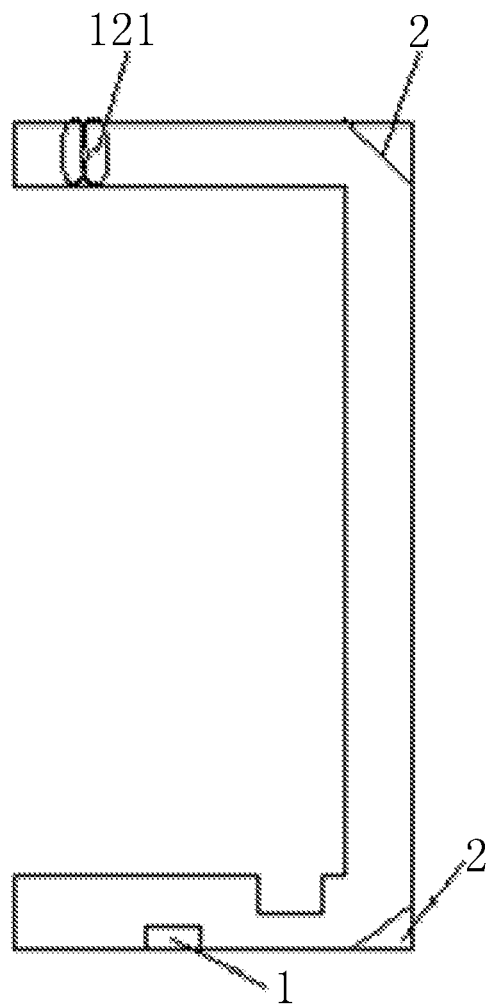
FIG. 8 is a schematic view showing a transmission light path for the projection device according to one embodiment of the present disclosure.

It should be appreciated that, the projection unit includes a projected image generation element. For example, for a Digital Light Processor (DLP) projector, its projected image generation element includes a light source, an analog-to-digital (A/D) decoder, a memory chip, an image processor and a digital micromirror device. With reference to FIG. 8 which shows a transmission light path of the projection unit, the image from the mobile terminal is processed by the A/D decoder, a Digital Signal Processor (DSP) and the image processor. A resultant light beam from the light source is transmitted through a three-color lens which is being rotated at a high speed, projected toward the digital micromirror device 1, reflected by the digital micromirror device 1 and an optical system consisting of a plurality of reflection lens 2, and then projected by an objective lens 121, so as to display the corresponding projected image.

On the basis of the above structure, the projected image generation elements for generating the projected image, e.g., the light source, the A/D decoder, the memory chip, the image processor and the digital micromirror device, are arranged within an accommodation space in the support portion 110, and the projected image output elements, e.g., the objective lens and/or the reflection mirrors and lens, are arranged on the projection portion 120.

Figure 1C:
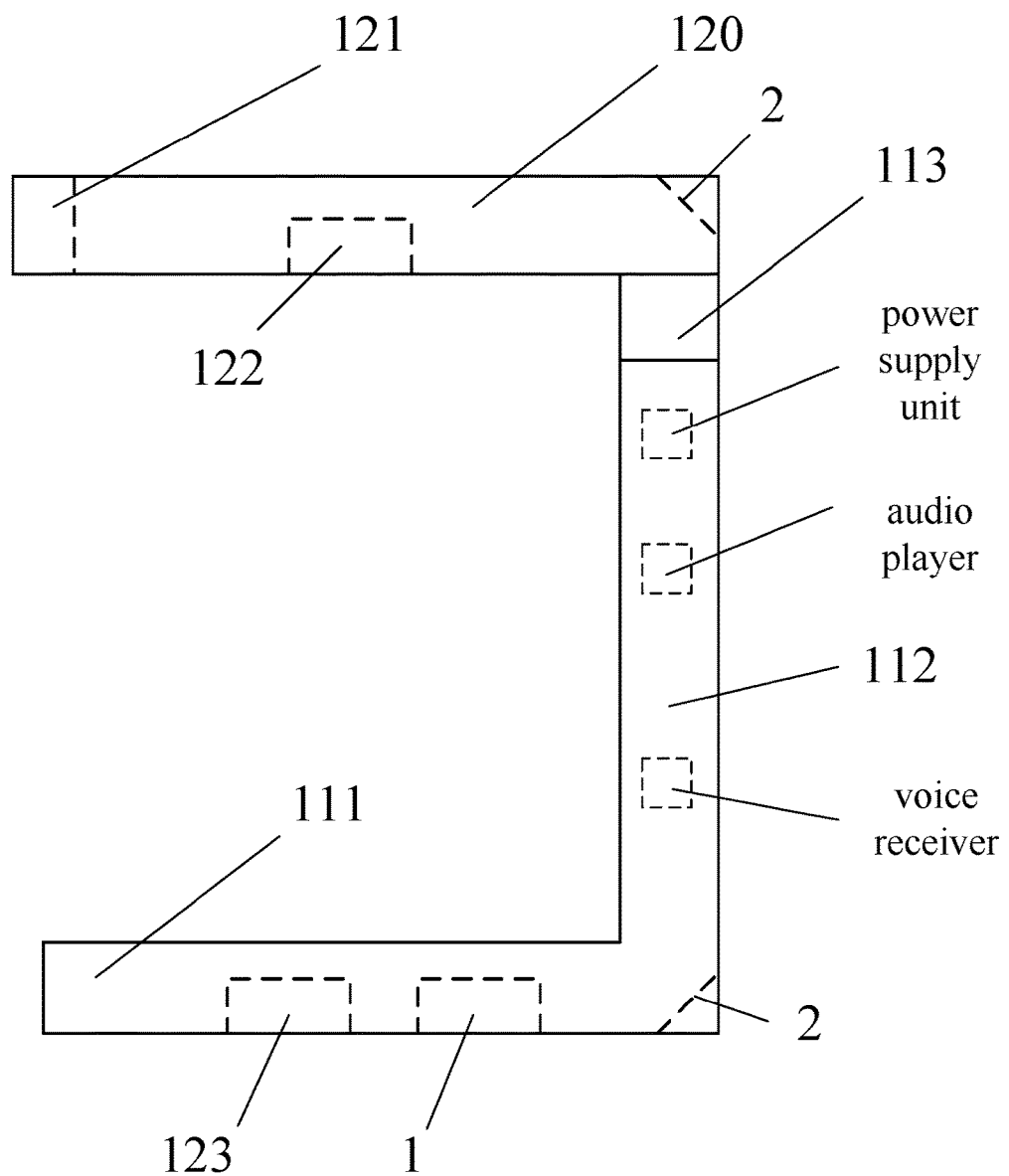
FIG. 1c is a sectional view of the projection device according to one embodiment of the present disclosure.

As shown in FIG. 1a, the objective lens 121 is arranged on an end surface of the projection portion 120, so as to project the projected image. In addition, in some embodiments of the present disclosure, as shown in FIG. 1c, the projected image generation element 123, e.g., the A/D decoder, the memory chip, the image processor and the digital micromirror device, may be arranged within the accommodation space in the base 111, and the projected image output element 122 may be accommodated within an accommodation space in the projection portion 120. The digital micromirror device 1 for the light path transmission of the projected image may be arranged within the accommodation space in the base 111, and the reflection lens 2 for the light path transmission of the projected image may be arranged within the accommodation space in the connector 112.

The above-mentioned structure of the projection unit is merely for illustrative purposes. It should be appreciated that, the structure of the projection unit is known in the art and it is not a research focus, and thus will not be particularly defined herein.

In a possible embodiment of the present disclosure, as shown in FIG. 1, a power supply unit, an audio player and a voice receiver may also be accommodated within the accommodation space in the support portion 110. The power supply unit is configured to provide power to the projection unit, and in the case that the mobile terminal is secured onto the projection device, the power supply unit is also capable of providing power to the mobile terminal through the first data interface of the projection device and the second data interface of the mobile terminal. The audio player is configured to, in the case that the mobile terminal is secured onto the projection device, play an audio file from the mobile terminal through the first data interface of the projection device and the second data interface of the mobile terminal. The voice receiver is configured to, in the case that the mobile terminal is secured onto the projection device, receive voice information from the user and transmit it to the mobile terminal through the first data interface of the projection device and the second data interface of the mobile terminal.

In some embodiments of the present disclosure, the power supply unit, the audio player and the voice receiver may be arranged within the accommodation space in the support portion 110 as shown in FIG. 1c.

Through the power supply unit, the audio player and the voice receiver, it is able to provide more functions for the projection device, so as to meet various requirements of the user.

Figure 2B:
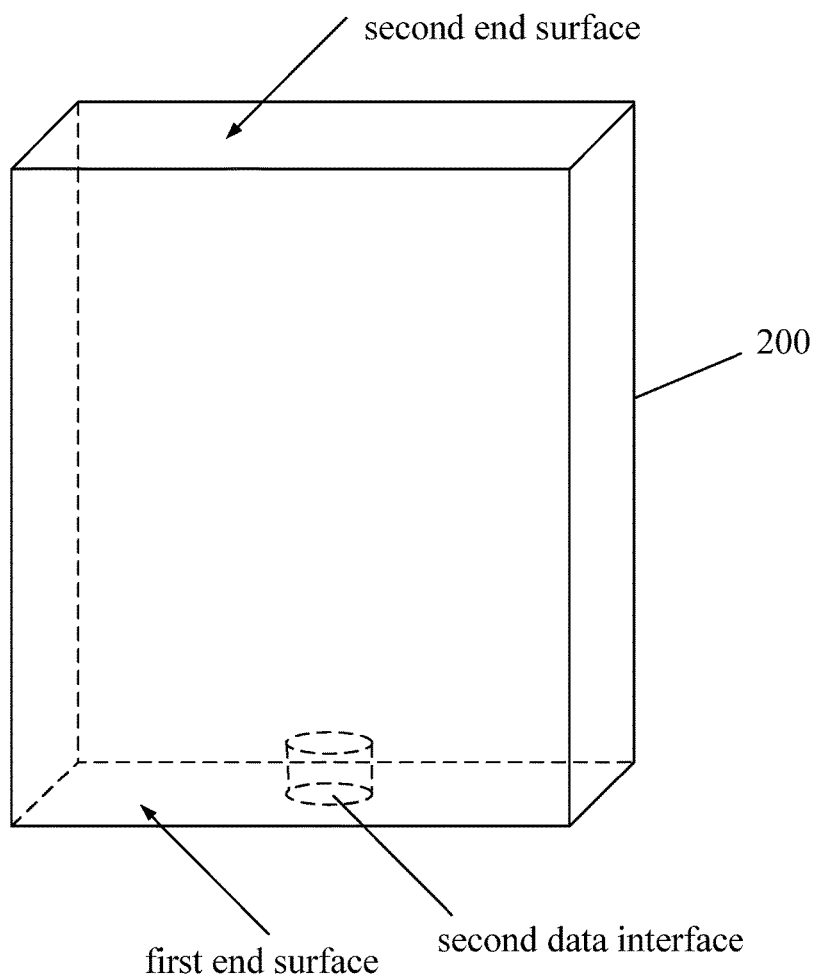

As shown in FIGS. 1a and 2a, the snap-in structure includes a first slot 130, and FIG. 2b shows the mobile terminal 200. In the case that the mobile terminal 200 is secured onto the device body 100 of the projection device, a portion of a first end surface of the mobile terminal 200 is snapped into the first slot 130.

In a possible embodiment of the present disclosure, the snap-in structure further includes a second slot arranged opposite to and parallel to the first slot 130. As shown in FIG. 2a, in the case that the mobile terminal 200 is secured onto the device body 100 of the projection device, a portion of a second end surface of the mobile terminal 200 opposite to the first end surface is snapped into the second slot, so as to form the structure as shown in FIG. 2. As shown in FIG. 3b, in some embodiments of the present disclosure, the first slot 130 is formed in the base 111, and the second slot 130' may be formed in the connector 112 and arranged opposite to the first slot 130. Through the second slot 130' and the first slot 130, it is able to secure the mobile terminal 200 onto the device body 100.

Figure 3A:
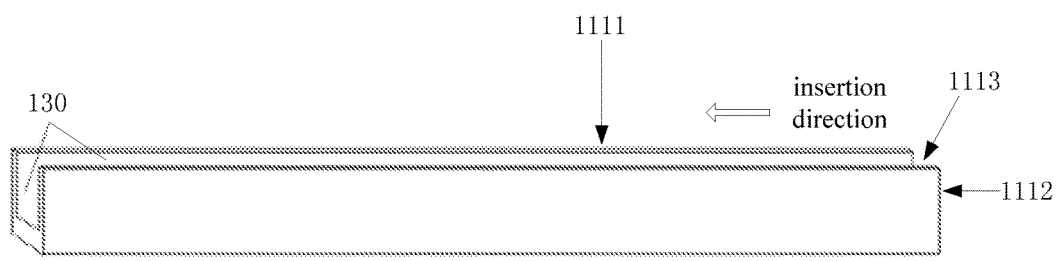
FIG. 3a is a schematic view showing a device body of the projection device with a first slot according to one embodiment of the present disclosure.
Figure 3B:
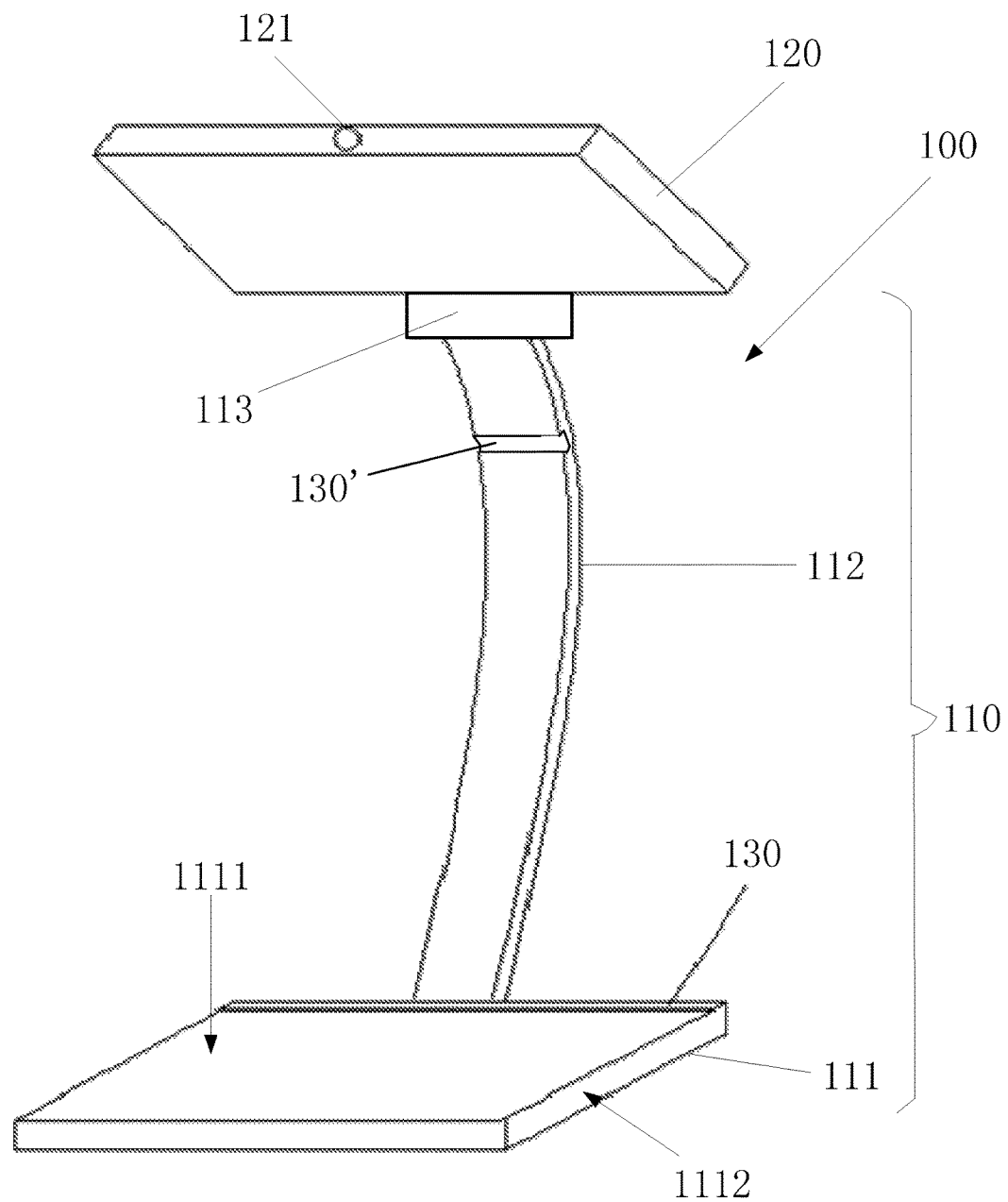
FIG. 3b is a schematic view showing the projection device with a second slot according to one embodiment of the present disclosure.

Further referring to FIGS. 1a and 3a, the first slot 130 is formed in an end surface 1111 of the base 111, and the first slot 130 is provided with an opening 1113 in an end surface 1112 (a third end surface) of the base 1111. The end surface 1112 is connected to the end surface 1111. The mobile terminal 200 is moved through the opening toward an end surface of the first slot 130 opposite to the end surface 1112, so as to insert the mobile terminal into the first slot 130. In a possible embodiment of the present disclosure, the second slot 130' is also provided with an opening at a side identical to the opening 1113. In the case that the mobile terminal 200 is inserted into the first slot 130 through the opening 1113, it may also be inserted into the second slot. FIG. 3c shows the second slot 130'.

In some embodiments of the present disclosure, the first data interface of the projection device connected to the second data interface of the mobile terminal is arranged at a bottom of the first slot 130, and the second data interface is arranged at the first end surface of the mobile terminal 200 snapped into the first slot 130. In the case that the first end surface of the mobile terminal 200 is snapped into the first slot 130, the first data interface and the second data interface are arranged at corresponding positions and connected to each other.

In a possible embodiment of the present disclosure, the first data interface is movably arranged on the device body 100. In the case that the mobile terminal 200 is separated from the device body 100, the first data interface is located at a first position away from a position of the second data interface of the mobile terminal 200 secured onto the device body 100. In the case that the mobile terminal 200 is secured onto the device body 100, the first data interface is located at a second position and connected to the second data interface.

In a possible embodiment of the present disclosure, the device body 100 is further provided with a touch button connected to the first data interface through a driving mechanism. In the case that the mobile terminal 200 is secured onto the device body, the mobile terminal is pressed against the touch button, so as to trigger the driving mechanism, thereby to move the first data interface from the first position to the second position.

Figure 4:
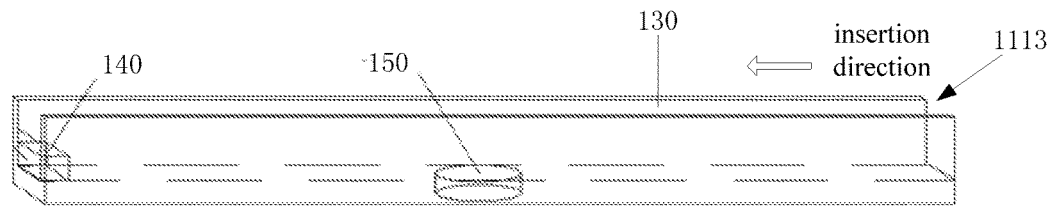
FIG. 4 is a schematic view showing a position relationship among the first slot, a touch button and a first data interface according to one embodiment of the present disclosure.

In some embodiments of the present disclosure, the touch button is arranged inside the first slot 130. FIG. 4 shows the position relationship among the first slot 130, the touch button 140 and the first data interface 150. As shown in FIGS. 4 and 2a, the touch button 140 is arranged at a side away from the opening of the first slot 130 through which the mobile terminal is inserted, the first data interface 150 is arranged at the bottom of the first slot 130 and capable of moving up and down, and the first slot 130 is provided with a recess at the bottom. In the case that the mobile terminal 200 is not inserted into the first slot 130, the first data interface 150 is located within the recess (the first position). In the case that the mobile terminal 200 is inserted through the opening 1113 of the first slot 130 and moves toward the touch button 140, the insertion of the mobile terminal 200 may not be adversely affected because the first data interface 150 is arranged within the recess. In the case that the mobile terminal 200 is pressed against the touch button 140, the driving mechanism may be triggered, so as to drive the first data interface 150 to move upward and out of the recess. At this time, the second data interface of the mobile terminal 200 is just located at a position corresponding to the first data interface 150, i.e., the first data interface 150 has moved upward to the second position, so the first data interface 150 may be connected to the second data interface.

Through the movement of the touch button 140 and the first data interface 150, it is able to achieve the insertion of the mobile terminal conveniently.

Figure 5A:
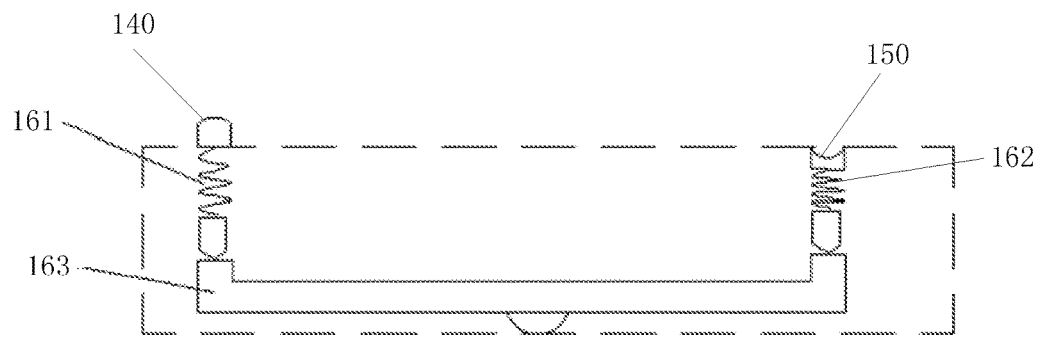
FIGS. 5a and 5b are schematic views showing a driving mechanism arranged between the touch button and the first data interface according to one embodiment of the present disclosure.
Figure 5B:
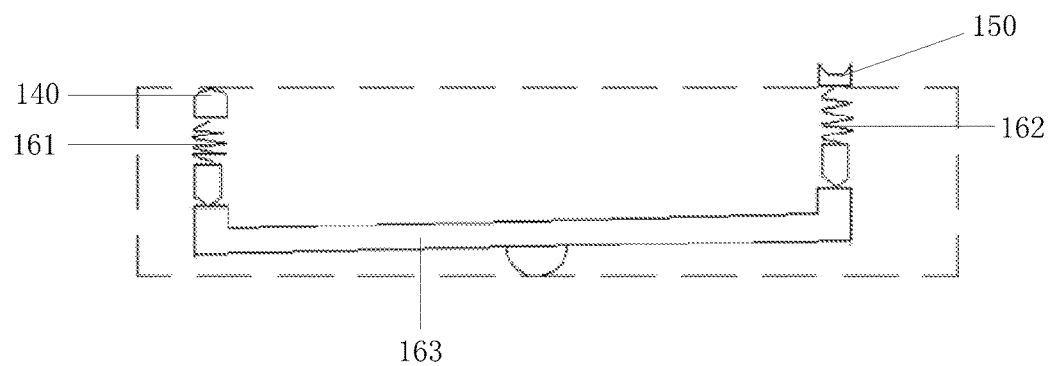

FIGS. 5a and 5b are schematic views showing the driving mechanism for moving the touch button 140 and the first data interface.

In one possible embodiment of the present disclosure, the driving mechanism includes a first elastic support structure 161 connected to the touch button 140, a second elastic support structure 162 connected to the first data interface 150, and a rod-like structure 163 connected between the first elastic support structure 161 and the second elastic support structure 162.

The first elastic support structure 161 and the second elastic support structure 162 may each be a spring. Of course, any other member having an elastic support function may also be applied. In addition, the rod-like structure 163 is supported at a support point so as to form a lever, two ends of which are connected to the first elastic support structure 161 and the second elastic support structure 162 respectively.

Through the above-mentioned structure, in the case that the mobile terminal is not inserted into the first slot 130, the first elastic support structure 161 and the second elastic support structure 162 are each in a natural state. At this time, the touch button 140 protrudes in the first slot 130, and the first data interface 150 is located at the first position, i.e., within the recess at the bottom of the first slot 130, as shown in FIG. 5a. In the case that the mobile terminal is inserted through the opening of the first slot 130, moves toward the touch button 140 and is pressed against the touch button 140, the first elastic support structure 161 is pressed. At this time, on the basis of a lever principle of the rod-like structure 163, the second elastic support structure 162 is ejected upward due to an upward force applied thereto, as shown in FIG. 5b, so as to drive the first data interface 150 to move upward and be connected to the second data interface of the mobile terminal.

Figure 6A:
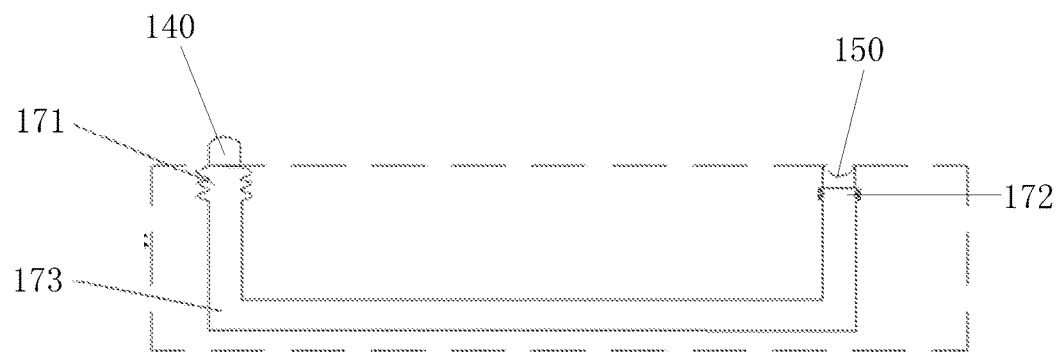
FIGS. 6a and 6b are further schematic views showing the driving mechanism arranged between the touch button and the first data interface according to one embodiment of the present disclosure.
Figure 6B:
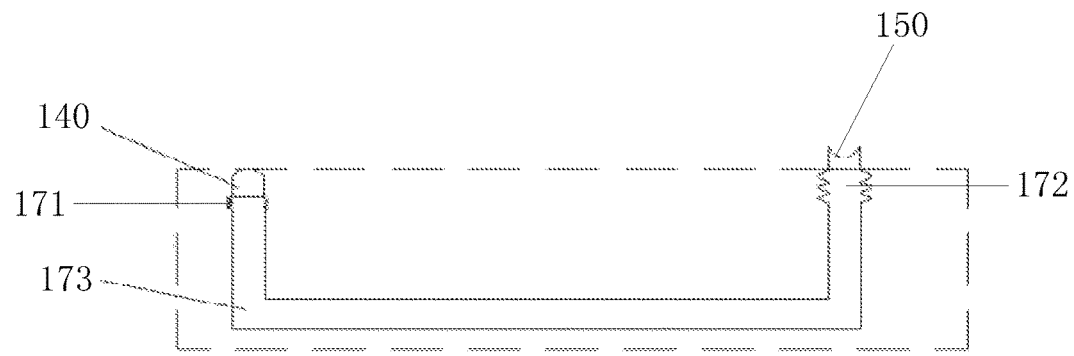

FIGS. 6a and 6b are schematic views showing the driving mechanism for moving the touch button 140 and the first data interface.

In another possible embodiment of the present disclosure, the driving mechanism includes a first airbag 171 connected to the touch button 140, a second airbag 172 connected to the first data interface 150, and a pipeline 173 in communication with the first airbag 171 and the second airbag 172.

Through the above-mentioned structure, in the case that the mobile terminal is not inserted into the first slot 130, pressures in the first airbag 171, the second airbag 172 and the pipeline 173 are in an equilibrium state. The second airbag 172 is in a natural state, so that the first data interface 150 is located at the first position, i.e., within the recess at the bottom of the first slot 130. The first airbag 171 is also in a natural state, so that the touch button 140 protrudes in the first slot 130, as shown in FIG. 6a. In the case that the mobile terminal is inserted through the opening of the first slot 130, moves toward the touch button 140 and finally abuts against the touch button 140, the first airbag 171 is pressed so as to increase the pressure in the pipeline 173. At this time, the second airbag 172 is inflated and expanded, so as to enable the first data interface 150 to be ejected, as shown in FIG. 6b. The first data interface 150 moves upward and is finally connected to the second data interface of the mobile terminal.

Figure 7A:
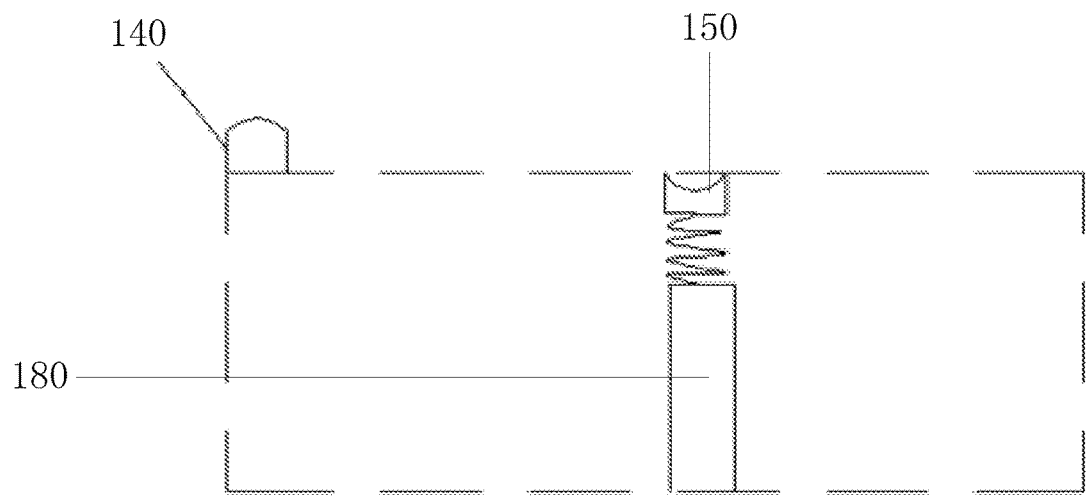
FIG. 7a is yet another schematic view showing the driving mechanism arranged between the touch button and the first data interface according to one embodiment of the present disclosure.

FIG. 7a is a schematic view showing the driving mechanism for moving the touch button 140 and the first data interface.

In yet another possible embodiment of the present disclosure, the driving mechanism includes a pressure sensor connected to the touch button 140, a time-delay circuit electrically connected to the pressure sensor, and an actuator 180 connected to the time-delay circuit and the first data interface.

Figure 7B:
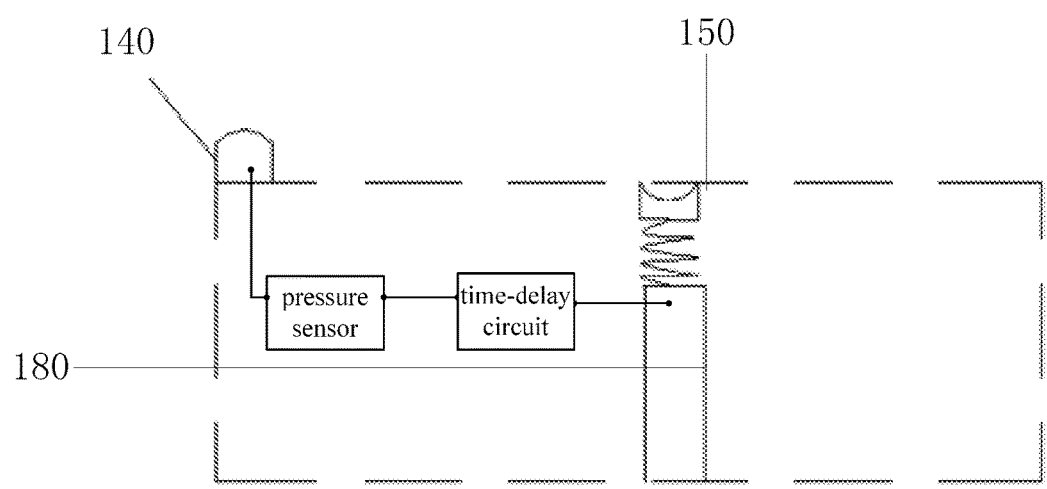
FIG. 7b is still yet another schematic view showing the driving mechanism arranged between the touch button and the first data interface according to one embodiment of the present disclosure.

FIG. 7b shows the pressure sensor and the time-delay circuit.

In the driving mechanism, the pressure sensor may be arranged on the touch button 140. In the case that the mobile terminal is not inserted into the first slot 130, the first data interface 150 is located at the first position, i.e., within the recess at the bottom of the first slot 130, and the touch button 140 protrudes in the first slot 130. In the case that the mobile terminal is inserted through the opening of the first slot 130, moves toward the touch button 140 and abuts against the touch button 140, the pressure sensor on the touch button 140 generates a predetermined triggering signal in accordance with the pressure. Upon the receipt of the triggering signal from the pressure sensor, the time-delay circuit generates a control signal after a predetermined time period and transmits it to the actuator 180. Then, the actuator 180 drives the first data interface 150 to be ejected upward and finally connected to the second data interface of the mobile terminal.

The actuator 180 for driving the first data interface 150 to be ejected upward may be of various structures, e.g., it may include a spring or an electromagnetic induction coil. The actuator 180 may be charged so as to adhere the first data interface 150, and discharged so as to release and eject the first data interface 150 upward. In this way, it is able to move the first data interface 150 between the first position and the second position.

In a possible embodiment of the present disclosure, the projection unit includes a first projection structure for projecting an image displayed on the screen of the mobile terminal and a second projection structure for projecting an image of a keyboard.

Each of the first projection structure and the second projection structure includes the projected image generation element and the projected image output element. In other words, for the device body 100 in FIG. 1, the projected image generation elements of the first and second projection structures are arranged on the support portion 110, and the projected image output elements of the first and second projection structures are arranged on the projection portion 120. Through the first and second projection structures, the image displayed on the screen of the mobile terminal and the image of the keyboard may be displayed simultaneously. At this time, it is able for the user to view the image displayed on the screen of the mobile terminal and input the data into the mobile terminal through the projected keyboard.

In a possible embodiment of the present disclosure, in order to facilitate the inputting of the data into the mobile terminal through the projected keyboard, the projection device further includes a camera configured to acquire an image in the case that the user inputs the data through the projected keyboard, so as to analyze and determine the data inputted by the user.

In a possible embodiment of the present disclosure, the projection portion of the device body includes two parts, where the projected image output elements of the first and second projection structures are arranged respectively. In other words, the images are projected in different directions, e.g., the image displayed on the screen of the mobile terminal is projected downward to a wall surface, and the image of the keyboard for inputting the data is projected downward to a desk surface, so as to meet the different requirements.

In addition, the way for projecting the image displayed on the screen of the mobile terminal and the image of the keyboard by the projection unit and the way for inputting the data through the image of the keyboard are known in the art, and they are not the research focus, which will thus not be particularly defined herein.

The projection device in the embodiments of the present disclosure may be applied to the mobile terminal such as a mobile phone or a pad.

According to the projection device in the embodiments of the present disclosure, the mobile terminal such as the mobile phone or pad may be inserted into the device body, so as to achieve the projection function, and in the case that it is unnecessary to achieve the projection function, the mobile terminal may be directly separated from the projection device, so as to meet the various requirements. In addition, the movable data interface and the touch button are arranged in the slot into which the mobile terminal is snapped, so it is able to facilitate the insertion of the mobile terminal into the device body and facilitate the separation of the mobile terminal from the device body, and ensure the data transmission between the projection device and the mobile terminal. Further, it is able for the projection device to project the image displayed on the mobile terminal and the image of the keyboard for inputting the data into the mobile terminal, thereby to meet various requirements of the user.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A projection device, comprising:
    a device body comprising a snap-in structure for securing a mobile terminal;
    a first data interface arranged on the device body and connected to a second data interface of the mobile terminal; and
    a projection unit secured on the device body and connected to the first data interface,
    wherein the device body comprises a support portion and a projection portion connected to the support portion through a rotation mechanism, an inclination angle of the projection portion relative to the support portion is capable of being changed through the rotation mechanism.

2. The projection device according to claim 1, wherein the projection unit comprises a projected image generation element secured onto the support portion and a projected image output element secured onto the projection portion.

3. The projection device according to claim 1, wherein the snap-in structure comprises a first slot, a portion of a first end surface of the mobile terminal is capable of being snapped into the first slot.

4. The projection device according to claim 3, wherein the snap-in structure further comprises a second slot, a portion of a second end surface of the mobile terminal opposite to the first end surface is capable of being snapped into the second slot, and the second slot is arranged opposite to and parallel to the first slot.

5. The projection device according to claim 3, wherein the first slot is provided with an opening at an end surface of the device body, the end surface with the opening is connected to an end surface with the first slot, and the mobile terminal is capable of being moved through the opening and along the first slot toward an end surface opposite to the end surface with the opening so that the portion of the first end surface of the mobile terminal is inserted into the first slot.

6. A projection device, comprising:
 a device body comprising a snap-in structure for securing a mobile terminal;
 a first data interface arranged on the device body and connected to a second data interface of the mobile terminal; and
 a projection unit secured on the device body and connected to the first data interface,
 wherein the first data interface is movably arranged on the device body;
 when the mobile terminal is separated from the device body, the first data interface is located at a first position away from a position of the second data interface of the mobile terminal secured onto the device body; and
 when the mobile terminal is secured onto the device body, the first data interface is located at a second position and connected to the second data interface.

7. The projection device according to claim 6, wherein the device body is further provided with a touch button connected to the first data interface through a driving mechanism; and
 when the mobile terminal is secured onto the device body, the mobile terminal is pressed against the touch button, to trigger the driving mechanism, thereby to move the first data interface from the first position to the second position.

8. The projection device according to claim 7, wherein the driving mechanism comprises a first elastic support structure connected to the touch button, a second elastic support structure connected to the first data interface, and a rod-like structure connected between the first elastic support structure and the second elastic support structure.

9. The projection device according to claim 7, wherein the driving mechanism comprises a first airbag connected to the touch button, a second airbag connected to the first data interface, and a pipeline in communication with the first airbag and the second airbag.

10. The projection device according to claim 7, wherein the driving mechanism comprises a pressure sensor connected to the touch button, a time-delay circuit electrically connected to the pressure sensor, and an actuator connected to the time-delay circuit and the first data interface;
 the time-delay circuit is configured to receive a predetermined signal from the pressure sensor and transmit a control signal to the actuator after a predetermined time period; and
 the actuator is configured to drive the first data interface to move.

11. A projection device, comprising:
 a device body comprising a snap-in structure for securing a mobile terminal;
 a first data interface arranged on the device body and connected to a second data interface of the mobile terminal;
 a projection unit secured on the device body and connected to the first data interface; and
 a first projection structure for projecting an image displayed on a screen of the mobile terminal and a second projection structure for projecting an image of a keyboard.

12. The projection device according to claim 1, wherein the device body is further provided with a power supply unit, an audio player and a voice receiver, each of the power supply unit, the audio player and the voice receiver is connected to the first data interface.

13. The projection device according to claim 2, wherein the support portion includes a base and a connector configured to connect the base to the projection portion.

14. The projection device according to claim 13, wherein the snap-in structure comprises a first slot formed in the base, and a portion of a first end surface of the mobile terminal is snapped into the first slot.

15. The projection device according to claim 14, wherein the snap-in structure further comprises a second slot, a portion of a second end surface of the mobile terminal opposite to the first end surface is capable of being snapped into the second slot, and the second slot is arranged opposite to and parallel to the first slot.

16. The projection device according to claim 14, wherein the first slot is provided with an opening at an end surface of the base, the end surface with the opening is connected to an end surface with the first slot, and the mobile terminal is moved through the opening and along the first slot toward an end surface opposite to the end surface with the opening so that the portion of the first end surface of the mobile terminal is inserted into the first slot.

17. The projection device according to claim 15, wherein the second slot is formed in the connector.

18. The projection device according to claim 1, wherein the first data interface is movably arranged on the device body between a first position and a second position, and the first data interface is connected to the second data interface at the second position, and separated from the second data interface at the first position.

* * * * *